(12) United States Patent
Streiff

(10) Patent No.: US 9,217,300 B1
(45) Date of Patent: Dec. 22, 2015

(54) SUBSEA RISER SUPPORT AND METHOD FOR BRIDGING ESCARPMENTS

(71) Applicant: TECHNIP FRANCE, Courbevoie (FR)

(72) Inventor: Jean-Luc Streiff, Houston, TX (US)

(73) Assignee: Technip France, Courbevoie (FR)

(*) Notice: Subject to any disclaimer, the term of this patent is extended or adjusted under 35 U.S.C. 154(b) by 0 days.

(21) Appl. No.: 14/549,834

(22) Filed: Nov. 21, 2014

(51) Int. Cl.
*E21B 17/01* (2006.01)
*E21B 17/10* (2006.01)

(52) U.S. Cl.
CPC .......... *E21B 17/1007* (2013.01); *E21B 17/015* (2013.01); *E21B 17/017* (2013.01)

(58) Field of Classification Search
CPC . E21B 17/015; E21B 17/017; E21B 41/0007; E21B 43/0107; E21B 43/013; F16L 57/02; F16L 1/16; F16L 1/20
USPC ............... 166/338, 346, 352, 367; 405/168.1, 405/168.2
See application file for complete search history.

(56) References Cited

U.S. PATENT DOCUMENTS

| | | | | |
|---|---|---|---|---|
| 1,677,077 | A * | 7/1928 | Fortune | 285/116 |
| 3,911,689 | A * | 10/1975 | Hogan | F16L 1/16 405/166 |
| 4,516,881 | A | 5/1985 | Beynet et al. | |
| 4,647,255 | A * | 3/1987 | Pow | 405/168.1 |
| 4,708,525 | A * | 11/1987 | Beynet | B63B 21/502 166/367 |
| 4,741,647 | A * | 5/1988 | Dumazy et al. | 405/224.4 |
| 5,192,166 | A * | 3/1993 | Persson | F16L 1/16 405/167 |
| 5,447,392 | A * | 9/1995 | Marshall | 405/224.4 |
| 5,873,677 | A * | 2/1999 | Davies et al. | 405/195.1 |
| 6,176,646 | B1 * | 1/2001 | Finn et al. | 405/224.2 |
| 6,467,545 | B1 * | 10/2002 | Venkataraman et al. | 166/367 |
| 6,739,804 | B1 | 5/2004 | Haun | |
| 6,746,182 | B2 * | 6/2004 | Munk et al. | 405/224.2 |
| 8,100,606 | B2 * | 1/2012 | Brown | F16L 1/20 405/171 |
| 8,474,539 | B2 * | 7/2013 | Luo et al. | 166/367 |
| 8,955,593 | B2 * | 2/2015 | Batista De Barros | E21B 19/004 166/345 |
| 2003/0021634 | A1 | 1/2003 | Munk et al. | |
| 2008/0007056 | A1 * | 1/2008 | Beesley | 285/321 |
| 2010/0133811 | A1 * | 6/2010 | Taylor | 285/313 |
| 2012/0257930 | A1 * | 10/2012 | Persson | 405/168.1 |

FOREIGN PATENT DOCUMENTS

| | | |
|---|---|---|
| EP | 0898047 | 2/1999 |
| EP | 0911482 A2 * | 4/1999 |
| GB | 2356229 | 5/2001 |

OTHER PUBLICATIONS

Manolache, I., International Search Report for International Patent Application No. PCT/US2010/046296, European Patent Office, dated Apr. 14, 2011.
Manolache, I., Written Opinion for International Patent Application No. PCT/US2010/046296, European Patent Office, dated Apr. 14, 2011.

* cited by examiner

*Primary Examiner* — Matthew R Buck
(74) *Attorney, Agent, or Firm* — Locke Lord LLP

(57) ABSTRACT

The present disclosure provides a lateral external sleeve for a riser that can be preinstalled or field installed around the riser as it is deployed onto the seabed and a stress joint installed with the riser and longitudinally partially within the lateral external sleeve. The external sleeve in conjunction with the stress joint can support a laterally deployed riser in an otherwise high stress zone of the riser as it would bend due to changes in elevations and thus reduce stress on the riser. The system can act independently of a buoy-based system typically used in the art.

14 Claims, 2 Drawing Sheets

SUBSEA RISER SUPPORT AND METHOD FOR BRIDGING ESCARPMENTS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The disclosure generally relates to the subsea riser supports. Specifically, the disclosure relates to the subsea riser supports for laterally disposed risers that are stressed by gravity forces.

2. Description of the Related Art

Not all subsea risers are disposed vertically. Risers can lay laterally from an oil or gas well across a seabed before curving upward to an offshore platform at the water surface. This configuration is especially true, when a field is developed for production with multiple risers spaced around the field that converge upward to an offshore platform.

Further, not all seabeds are smooth, level surfaces, despite the many illustrations in literature. Rocky abutments, canyons, cliffs, and other escarpments must be crossed by the risers to connect with the offshore platform. Gravity forces on the risers tend to bend the risers, as they lay in a lateral orientation across the subsea structures and cause undesirable stress, as illustrated in FIG. 1. A seabed 2 can have many projections and depressions in its surface. A riser 4 will conform to some degree to the surface due to the gravity forces, causing bending stresses on the riser. While risers can be designed to withstand the stress, the design can be costly in material and expense Prior efforts generally involve buoys to support the riser across the unlevel surface in a neutral buoyancy mode. Some examples are illustrated in FIGS. 2 and 3. In FIG. 2, a floating arch is preinstalled by securing a tether 8 with an anchor 6 to the seabed and coupling the tether 8 to a floating buoy 10. The riser 4 is supported by the floating buoy tethered to the seabed to form the supporting arch. In FIG. 3, floating buoys 12 are installed to the riser 4 and float the riser over the different structural changes in the seabed. A variation is shown in FIG. 3 in that a floating buoy 16 can be connected with a tether 14 to the riser 4 to accomplish the same purpose.

Because such typical designs depend on floatation, the degradation of the buoys over life of service can cause buoy failure and with the failure potential riser failure. Additionally, the costs and effort in establishing a buoy-based system can be substantial.

There remains then a need to provide a long-lasting alternative to support a riser across elevational changes in a seabed.

BRIEF SUMMARY OF THE INVENTION

The present disclosure provides a lateral external sleeve for a riser that can be field installed around the riser as it is deployed onto the seabed and a stress joint installed with the riser and longitudinally partially within the lateral external sleeve. The external sleeve in conjunction with the stress joint can support a laterally deployed riser in an otherwise high stress zone of the riser as it would bend due to changes in elevations and thus reduce stress on the riser. The system can act independently of a buoy-based system typically used in the art.

The disclosure provides a riser support system comprising: an external sleeve coupled around a riser; and a stress joint coupled to the riser and disposed longitudinally at an end of the external sleeve. Further, the system can include one or more spacers that can be disposed between an inside of the external sleeve and an outside of the riser;

The disclosure provides a method of supporting a lateral riser disposed on a seabed, comprising: coupling an external sleeve around a riser; and coupling a stress joint to the riser longitudinally at an end of the external sleeve. Further, the method can include installing one or more spacers between an inside of the external sleeve and an outside of the riser.

DETAILED DESCRIPTION

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. Where appropriate, one or more elements may have been labeled with an "A" or "B" to designate various members of a given class of an element. When referring generally to such elements, the number without the letter can be used. Further, such designations do not limit the number of members that can be used for that function.

The present disclosure provides a lateral external sleeve for a riser that can be preinstalled or field installed around the riser as it is deployed onto the seabed and a stress joint installed with the riser and longitudinally partially within the lateral external sleeve. The external sleeve in conjunction with the stress joint can support a laterally deployed riser in an otherwise high stress zone of the riser as it would bend due to changes in elevations and thus is reduce stress on the riser. The system can act independently of a buoy-based system typically used in the art.

Figure 1:
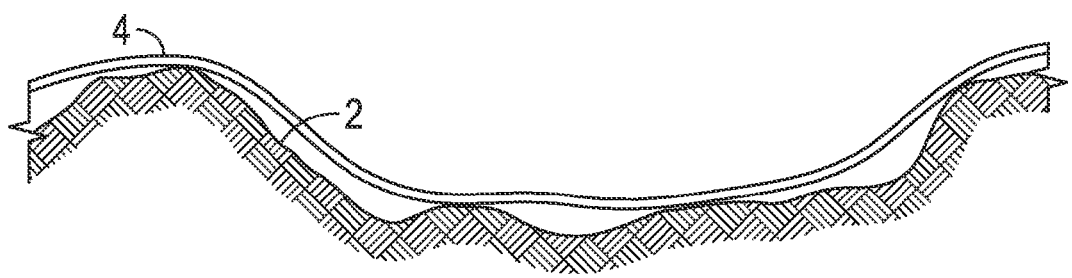
FIG. 1 is a schematic illustrating a prior art conditions of an unsupported lateral riser crossing various elevations of a seabed.
Figure 2:
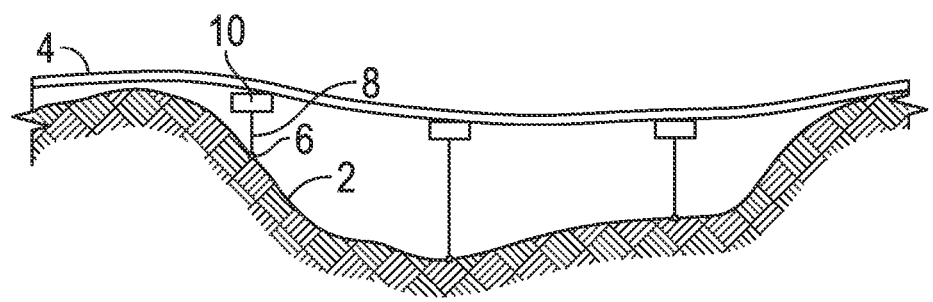
FIG. 2 is a schematic of a prior art buoy system forming a floating arch to support a lateral riser crossing various elevations of the seabed.
Figure 3:
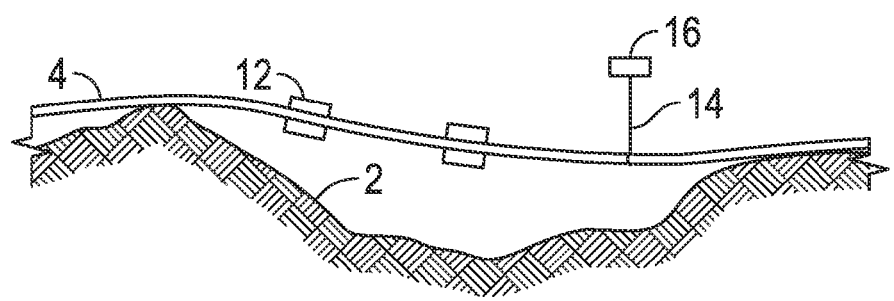
FIG. 3 is a schematic of another prior art buoy system coupled to the riser to support a lateral riser crossing various elevations of the seabed.
Figure 4:
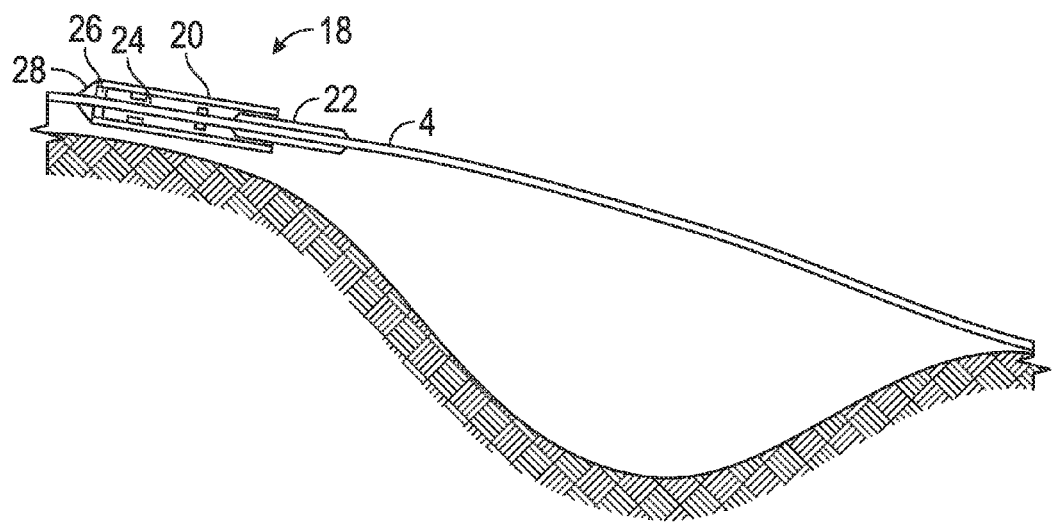
FIG. 4 is a schematic of an exemplary embodiment of the invention having a riser support system with an external sleeve and a stress joint coupled with a lateral riser to support the riser across the seabed.
Figure 5:
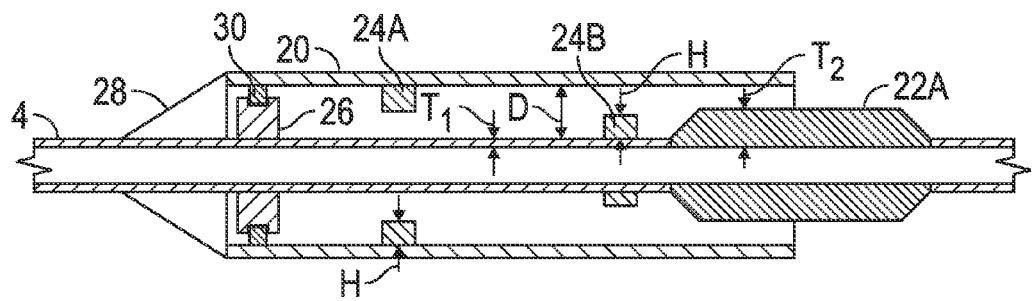
FIG. 5 is a detailed schematic of the riser support system of FIG. 4.

FIG. 4 is a schematic of an exemplary embodiment of the invention having a riser support system with an external sleeve and a stress joint coupled with a lateral riser to support the riser across the seabed. FIG. 5 is a detailed schematic of the riser support system of FIG. 4. The figures will be described in conjunction with each other.

A riser support system 18 can be coupled to the riser 4 to support the riser when the riser is installed in a lateral position on the seabed 2. The riser support system 18 can include an external sleeve 20 that can be installed around the riser 4. For example and without limitation, the external sleeve 20 can be 10-60 meters long, and further can be 40-50 meters, such as about 45 meters long. An annular space having a thickness of distance D is formed between an inside of the external sleeve 20 and an outside of the riser 4. A stress joint 22A (generally "22") can be installed with the riser 4 generally longitudinally at an end of the external sleeve 20, where the riser exits the end of the external sleeve 20 and bending stresses will generally be significant on the riser without the stress joint. For example and without limitation, the stress joint can be 5-20 meters long, and further can be 10-15 meters long, such as about 12 meters long. The stress joint 22A shown in FIG. 5 can include a wall thickness T2 that is thicker than a wall thickness T1 of the riser 4 to form a smaller annular space between the sleeve 20 and the stress joint 22 with a thickness of D−(T2−T1). As shown in FIG. 5, the annular space(s) allows the riser and/or the stress joint to flex and bend and otherwise move radially within the sleeve 20. Generally, a middle portion of the stress joint 22 will be disposed in longitudinal alignment with the end of the external sleeve 20, although the middle portion can be longitudinally offset one way or the other, depending on the particular stresses envisioned for the riser at the end of the external sleeve 20. Thus, as the riser exits the external sleeve 20, the stress inflection at that location is reduced through the stress joint 22 and helps maintain the riser 4 in a lateral position across the seabed 2.

One or more spacers 24A, 24B (generally "24") can be installed between the inside of the external sleeve 20 and the outside of the riser 4. In some embodiments, one or more spacers 24 can be installed on the inside surface of the external sleeve, such as spacer 24A. In other embodiments, one or more spacers 24 can be installed on an outside of the riser, such as spacer 24B. Generally, the spacers will have a height H that is less than the distance D that is between the inside of the external sleeve and the outside of the riser.

The external sleeve 20 can be coupled with the riser 4 by clamping, welding, or other means of fastening. Generally, it is envisioned that a clamp 26 will be used, so that the is metallurgical qualities of the riser and/or external sleeve are not affected by a high heat application of welding. The clamp 26 can be coupled to the riser and engage a clamp mate 30 that is coupled to the external sleeve 20. Alternatively, the orientations of the clamp 26 and clamp mate 30 can be reversed from the illustrated embodiment, so that the clamp is coupled to the external sleeve and engages the clamp mate coupled to the riser.

A transition nose 28 can be coupled to the riser 4, the external sleeve 20, or a combination thereof. The transition nose 28 can be useful in allowing the external sleeve 20 to be deployed using typical deployment equipment for risers from a floating vessel. The transition nose 28 can allow the external sleeve 20 to be more easily reeled out along with the riser 4 when installing on the seabed from a floating vessel in a typical fashion that a riser is reeled out. Further, the transition nose 28 can facilitate retrieving the riser 4 as the riser is reeled back onto the floating vessel. This ability to deploy and retrieve advantageously overcomes a limitation of prior efforts using buoys that generally required disassembly and removal from the riser prior to deploying the riser from the floating vessel or retrieving the riser onto a floating vessel.

Figure 6:
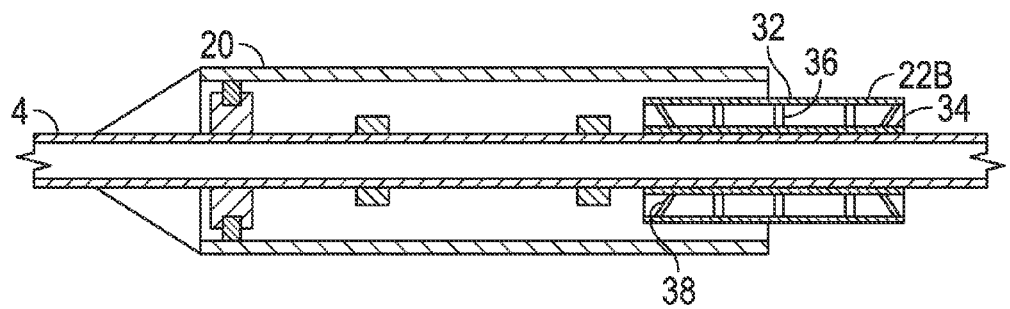
FIG. 6 is a detailed schematic of another embodiment of the riser support system of FIG. 4.

FIG. 6 is a detailed schematic of another embodiment of the riser support system of FIG. 4. The riser support system shown in FIG. 6 is similar to the riser support system shown in FIG. 5 with a variation of the stress joint 22, labeled "22B." In this embodiment, the stress joint 22B can include a stress joint outer sleeve 32 that is coupled with a stress joint inner sleeve 34 through an intermediate stress joint link ring 36. Optionally, one or more spacers 38 can be installed near one or more ends of the stress joint 22B. The combination of the stress joint inner sleeve coupled with the stress joint outer sleeve can provide a potentially economical alternative to the one-piece stress joint 22A that is illustrated in FIG. 5. The stress joint 22B can be similarly installed as described above at the end of the external sleeve 20 on the riser 4.

Other and further embodiments utilizing one or more aspects of the invention described above can be devised without departing from the spirit of Applicant's invention. For example, other types of stress joints can be used, different transition noses, if any, can be used, different types of coupling of the external sleeve with the riser can be used, including different types of clamps, and other variations can occur in keeping within the scope of the claims.

Further, the various methods and embodiments of the system can be included in is combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. A riser support system comprising:
   an external sleeve coupled around a laterally disposed riser; and
   a stress joint coupled to the riser and disposed longitudinally at an end of the external sleeve having a portion inside the external sleeve, wherein an annular space is formed between the sleeve and the portion of the stress joint, the annular space configured to allow the portion of the stress joint to move radially within the sleeve.

2. The system of claim 1, further comprising one or more spacers disposed between an inside of the external sleeve and an outside of the riser.

3. The system of claim 1, further comprising a clamp coupled to the external sleeve and the riser to longitudinally maintain a position of the external sleeve with the riser.

4. The system of claim 3, wherein the clamp is coupled to the riser and engages a clamp mate on the external sleeve to be coupled to the external sleeve.

5. The system of claim 1, further comprising a transition nose coupled to the external sleeve, the riser, or a combination thereof.

6. The system of claim 1, wherein the stress joint has a wall thickness greater than a wall thickness of the riser.

7. The system of claim 1, wherein the stress joint comprises a stress joint outer sleeve, a stress joint inner sleeve, and a stress joint link ring coupled between the outer sleeve and the inner sleeve.

8. The system of claim 2, wherein the one or more spacers have a height that is less than a distance between the inside of the external sleeve and the outside of the riser.

9. A method of supporting a lateral riser disposed on a seabed, comprising:
   coupling an external sleeve around a laterally disposed riser;
   coupling a stress joint to the riser longitudinally at an end of the external sleeve wherein a portion of the stress joint is disposed within the external sleeve with an annular space formed between the sleeve and the portion of the stress joint; and
   allowing the stress joint to move radially within the sleeve.

10. The method of claim 9, further comprising installing one or more spacers between an inside of the external sleeve and an outside of the riser.

11. The method of claim 9, further comprising longitudinally clamping the external sleeve with the riser.

12. The method of claim 9, further comprising coupling a transition nose to the external sleeve, the riser, or a combination thereof.

13. The method of claim 9, further comprising installing the stress joint having a wall thickness greater than a wall thickness of the riser.

14. The method of claim 9, further comprising installing the stress joint around the riser wherein the stress joint comprises a stress joint outer sleeve, a stress joint inner sleeve, and a stress joint link ring coupled between the outer sleeve and the inner sleeve.

\* \* \* \* \*